US006918617B2

(12) United States Patent
Nordquist et al.

(10) Patent No.: US 6,918,617 B2
(45) Date of Patent: Jul. 19, 2005

(54) SELF-CENTERING SOLDERED FEED-THROUGH

(76) Inventors: Thaddeus E. Nordquist, 3099 Jodi La., Clearwater, FL (US) 34684; Eric Lawrence Nordquist, 809 Normandy Rd., Clearwater, FL (US) 33760; Kevin T. Luce, 14878 55$^{th}$ Way North, Clearwater, FL (US) 33760

( * ) Notice: Subject to any disclaimer, the term of this patent is extended or adjusted under 35 U.S.C. 154(b) by 17 days.

(21) Appl. No.: 10/775,020

(22) Filed: Feb. 9, 2004

(65) Prior Publication Data

US 2004/0182590 A1 Sep. 23, 2004

Related U.S. Application Data

(63) Continuation-in-part of application No. 10/393,162, filed on Mar. 20, 2003.

(51) Int. Cl.[7] .................................................. F16L 35/00
(52) U.S. Cl. .................... 285/289.1; 285/22; 285/289.5
(58) Field of Search ........................... 285/289.1, 289.2, 285/289.3, 289.5, 22; 174/152 GM

(56) References Cited

U.S. PATENT DOCUMENTS 1,931,666 A * 10/1933 Lindquist ................. 285/289.3
1,980,561 A * 11/1934 Wagner ....................... 285/22
2,174,218 A * 9/1939 Greene .................... 285/289.3
2,463,006 A * 3/1949 Vander Clute ............... 285/22
3,012,317 A * 12/1961 Wolfe ......................... 228/154
3,048,104 A * 8/1962 Burd .......................... 102/530
3,290,772 A * 12/1966 Crouch ....................... 228/135
3,833,986 A * 9/1974 DeCicco ................ 29/890.047
4,135,740 A * 1/1979 Watson, Jr. .................. 285/22
4,841,101 A 6/1989 Pollock
4,900,049 A * 2/1990 Tseng ...................... 280/281.1
5,101,889 A * 4/1992 Potier .......................... 165/150
5,223,672 A * 6/1993 Pinneo et al. .............. 174/52.4
5,380,048 A * 1/1995 Vogel .......................... 285/22
5,507,528 A * 4/1996 Mastrosimone .............. 285/22
5,524,938 A * 6/1996 Halder ....................... 285/201
5,936,494 A * 8/1999 Pollock ...................... 333/252
6,111,198 A * 8/2000 Tower ..................... 174/50.56

* cited by examiner

*Primary Examiner*—Eric K. Nicholson
(74) *Attorney, Agent, or Firm*—Mark A. Navarre

(57) ABSTRACT

A soldered feed-through device that is inserted into a bulkhead opening has one or more sets of laterally protruding and symmetrically distributed teeth that cut through the bulkhead material as the feed-through is inserted into the bulkhead opening. The teeth automatically center the feed-through device within the bulkhead opening and resist tilting of the feed-through and its through-hole conductor so that application of solder to the area between the feed-through and the inner periphery of the opening produces a solder joint having uniform radial thickness of preferably about 0.14 mm (0.0055 in.).

6 Claims, 1 Drawing Sheet

SELF-CENTERING SOLDERED FEED-THROUGH

RELATED PATENT APPLICATIONS

This application is a continuation-in-part of co-pending U.S. patent application Ser. No. 10/393,162, filed Mar. 20, 2003.

TECHNICAL FIELD

This invention relates to a feed-through device that is inserted into a bulkhead opening and soldered in place, and more particularly to a soldered feed-through that automatically centers in the bulkhead opening.

BACKGROUND OF THE INVENTION

A feed-through (or feed-thru) is a device used to enable communication of some sort through a bulkhead, such as a housing of an electronic module. In applications to which the present invention pertains, the feed-through has a solderable metal body portion that is inserted into a bulkhead opening and secured by reflowing solder into the space between the body portion and the inner periphery of the bulkhead opening. The body portion is provided with one or more axial through-holes that define communication paths through the bulkhead. The communication may be physical (pneumatic, liquid, gaseous or mechanical, for example), optical or electrical. In electrical applications, for example, each through-hole accommodates an electrical conductor, and sealant material in the space between each conductor and the inside diameter of the respective through-hole electrically insulates the conductor from the feed-through body portion and the bulkhead. Many electrical feed-throughs also include a filter component such as a ceramic capacitor coupled between the conductor and the body portion to provide noise suppression in electrical signals carried by the conductor. Other filter elements such as inductors and/or resistors may also be incorporated into the body portion to form various well-known filter topologies.

With soldered feed-throughs, the body portion and the bulkhead opening should be sized so that the solder joint therebetween has a substantially uniform radial thickness on the order of 0.14 mm (0.0055 in.) in order to ensure that the solder joint will be sufficiently durable to prevent cracking and yet sufficiently compliant to protect the feed-through filter components (if any) through repeated thermal cycling, particularly when the bulkhead is a high expansion material such as aluminum. From a processing standpoint, this requires some mechanism for maintaining the body portion centered in the bulkhead opening during the solder reflow process. In the U.S. Pat. No. 4,841,101 to Pollock, for example, a step is provided on either the bulkhead opening or body portion of the feed-through to position the feed-through in the bulkhead opening. However, the step approach requires close tolerances on both the feed-through and the bulkhead opening to achieve a snug mechanical fit; in cases where a snug fit is not achieved, the feed-through is free to tilt in the bulkhead opening before and during the soldering operation, creating undesired thin spots in the solder joint.

SUMMARY OF THE INVENTION

The present invention is directed to an improved and self-centering feed-through device designed to be inserted into a bulkhead opening and secured therein by soldering. The exterior periphery of the feed-through body portion includes one or more sets of laterally protruding and symmetrically distributed teeth or talons that cut through the bulkhead material as the feed-through is inserted into the bulkhead opening. The teeth occupy only a minor part of the body portion periphery, but automatically center the feed-through device within the bulkhead opening and resist tilting of the feed-through and its through-hole conductor so that application of solder to the area between the feed-through and the inner periphery of the bulkhead opening produces a solder joint having uniform radial thickness of preferably about 0.14 mm (0.0055 in.).

DESCRIPTION OF THE PREFERRED EMBODIMENT

Figure 1:
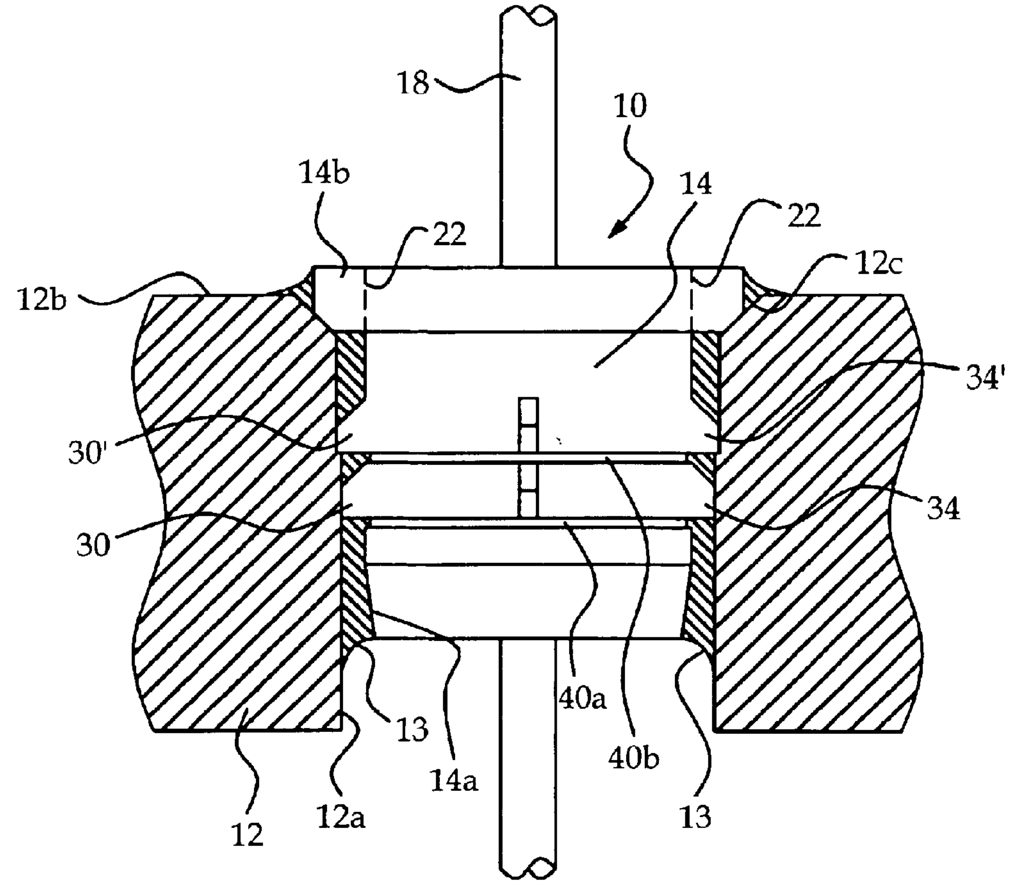
FIG. 1 is a side view of a soldered feed-through device according to this invention, as installed in a bulkhead opening.
Figure 2:
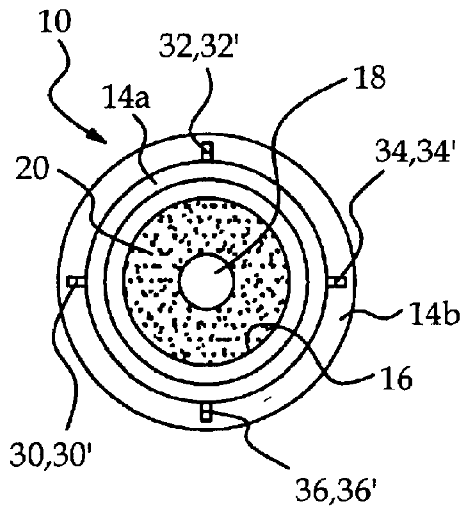
FIG. 2 is an inboard end view of the feed-through device of FIG. 1.

Referring to FIGS. 1–2, the reference numeral 10 generally designates a soldered feed-through device according to this invention; that is a feed-through that is inserted into an opening 12*a* of a bulkhead 12 and secured in place in the opening 12*a* by a solder joint 13 occupying the region between the feed-through 10 and the inner periphery of the opening 12*a*. In FIG. 1, the feed-through 10 is depicted as installed in the opening 12*a,* whereas in FIG. 2, the feed-through 10 is depicted prior to insertion into the opening 12*a*. In the illustrated embodiment, the feed-through 10 and bulkhead opening 12*a* are cylindrical in shape, and the body portion 14 of the feed-through 10 has a single axial through-hole 16 supporting a solid conductor 18 for feed-through electrical communications. However, it will be recognized that the present invention is equally applicable to feed-through devices that are non-cylindrical (rectangular, for example), to feed-through devices designed for physical or optical communications, or to feed-through devices having two or more through-holes supporting multiple communication channels. A sealant 20 fills the space in through-hole 16 around the conductor 18, and may be formed of a glass or ceramic composition, or an epoxy or thermosetting plastic material, depending on the application and the environmental sealing requirements. As also mentioned above, the feed-through 10 may include one or more filter elements such as a ceramic capacitor for electrically filtering signals carried by the conductor 18; such filter elements are typically housed in a suitable cavity (not shown) formed in the outboard end of body portion 14.

In the illustrated embodiment, the body portion 14 of feed-through 10 has a tapered inboard end 14*a* to facilitate insertion of the feed-through 10 into the opening 12*a,* and a flange 14*b* that contacts the exterior periphery 12*b* of the bulkhead 12 to limit the depth of insertion. However, the inboard end 14*a* may be un-tapered if desired, and the flange 14*b* may be omitted as indicated by the phantom lines 22. Elimination of the flange 14*b* may facilitate soldering depending on the solder process utilized, and allows the feed-through 10 to be mounted flush with respect to the bulkhead exterior periphery 12*b* if desired. Also, the lip 12*c* of the bulkhead opening 12*a* may be chamfered as shown to facilitate soldering and feed-through insertion, if desired. The bulkhead 12 may be formed of a solderable metal such as a tin or copper alloy, but is typically formed of die-cast zinc or aluminum, in which case the inner periphery of the opening 12*a* is plated with a solderable material such as a tin-based or lead-based material, or a gold-nickel material, prior to insertion of the feed-through. 10.

According to the present invention, the feed-through 10 features one or more sets of laterally protruding and symmetrically distributed teeth or talons that cut through the bulkhead material as the feed-through 10 is inserted into the bulkhead opening 12*a*. While the teeth occupy only a minor part of the body portion 14, and therefore minimally disturb the interior periphery of the opening 12*a,* they nevertheless act to (1) temporarily secure the feed-through 10 within the opening, and (2) automatically radially center the feed-through 10 within the opening 12*a*. In other words, the teeth cause the feed-through 10 to self-center on insertion into the opening 12*a,* and maintain the centered orientation of the feed-through 10 until the solder joint 13 is formed. As a result, the radial dimension or thickness of the solder joint 13 is substantially uniform and approximately 0.14 mm (0.0055 in.) in dimension in order to ensure that the solder joint 13 will be sufficiently durable to prevent cracking yet sufficiently compliant to protect the feed-through filter components (if any) through repeated thermal cycling, particularly when the bulkhead 12 is a relatively high thermal expansion material such as aluminum.

In the illustrated embodiment, the feed-through 10 has two sets of teeth, each set having four teeth symmetrically distributed about the lateral periphery of the body portion 14. Referring to FIGS. 1–2, the first set is defined by the laterally aligned teeth 30, 32, 34, 36, and the second set is defined by the laterally aligned teeth 30', 32', 34', 36'. The teeth 30, 30'; 32, 32'; 34, 34'; and 36, 36' are aligned parallel to an axis of insertion of the feed-through 10, and the outboard teeth 30', 32', 34', 36' protrude from the body portion 14 to a greater extent than the inboard teeth 30, 32, 34, 36. In a preferred arrangement, the inboard teeth 30, 32, 34, 36 are sized relative to the bulkhead opening 12*a* so that they center the feed-through 10 within the opening 12*a,* but do not substantially disturb the material on the inner periphery of the opening 12*a*. Accordingly, the teeth 30, 32, 34, 36 protrude about 0.14 mm (0.0055 in.) from the exterior periphery of the body portion 14 and set the desired solder joint radial thickness. The outboard teeth 30', 32', 34', 36', on the other hand, are sized so that they each cut into the material on the inner periphery of the opening 12*a*. In applications where the inner periphery of the opening 12*a* is plated to form a solderable surface, the cutting depth of the outboard teeth 30', 32', 34', 36' is preferably less than the plating thickness so that the disturbed portion of the opening 12*a* remains solderable.

Referring to FIG. 1, the body portion 14 of the feed-through 10 may optionally include one or more lateral or circumferential grooves 40*a,* 40*b*. In the illustrated embodiment, the groove 40*a* is located inboard of the teeth 30–36, and the groove 40*b* is located inboard of the teeth 30'–36'. Both grooves 40*a,* 40*b* retain solder and serve to regionally increase the lateral thickness of the solder joint 13, and the groove 40*b* serves the additional purpose of capturing bulkhead plating material cut by the teeth 30'–36'. Analysis has shown that the bulkhead material captured in the groove 40*b* tends to remain in mechanical continuity with the rest of the bulkhead 12, effectively holding the feed-through 10 in place in the bulkhead opening 12*a* despite the relatively small area of contact between the teeth 30'–36' and the bulkhead 12. Of course, there may be more or fewer grooves than shown, and/or they may be located in different areas of the body portion 14 than shown.

The progressively increasing lateral protrusion of the axially aligned teeth 30–36, 30'–36' also makes the feed-through 10 more tolerant to variation in the size of the bulkhead opening 12*a*. In cases where the opening 12*a* is smaller than specified, the depth of cut is simply increased; in cases where the opening 12*a* is larger than specified, the depth of cut is reduced, but still sufficient to center and temporarily retain the feed-through 10 within the opening 12*a*.

In summary, the feed-through of the present invention includes laterally protruding teeth that automatically center the feed-through within a bulkhead opening during its insertion, and resist tilting of the feed-through and its through-hold conductor within the opening so that application of solder to the area between the feed-through and the inner periphery of the bulkhead opening produces a solder joint having uniform radial thickness of a desired dimension. While the feed-through of this invention has been described in reference to the illustrated embodiment, it is expected that various modifications in addition to those mentioned above will occur to those skilled in the art. For example, the number of sets of teeth and the number of teeth per set may be greater or lesser than shown, the solder joint may be thinner or thicker than specified herein, and so on. Accordingly, it will be understood that feed-through devices incorporating these and other modifications may fall within the scope of this invention, which is defined by the appended claims.

What is claimed is:

1. A feed-through device having a body portion that is axially inserted into a bulkhead opening having an inner periphery that is plated with a solderable material and then secured in said opening by a solder joint in a region between said body portion and said solderable material, comprising:

a first set of teeth symmetrically distributed about a lateral periphery of said body portion and protruding laterally from said lateral periphery so as to cut into but not through said solderable material as said body portion is axially inserted into said opening for centering and retaining said body portion within said opening until said solder joint is formed.

2. The feed-through device of claim 1, further comprising:

a second set of teeth symmetrically distributed about the lateral periphery of said body portion and protruding laterally from said lateral periphery but inboard of said first set of teeth, said second set of teeth shaped to contact but not cut into said solderable material as said body portion is axially inserted into said opening for centering said body portion within said opening.

3. The feed-through device of claim 2, wherein said second set of teeth is axially aligned with said first set of teeth.

4. The feed-through device of claim 1, further comprising:

at least one lateral groove formed in the lateral periphery of said body portion, said solder joint extending into such groove.

5. The feed-through device of claim 1, including a lateral groove formed in the lateral periphery of said body portion inboard of said first set of teeth.

6. The feed-through device of claim 1, including a flange on an outboard end of said body portion that seats against the bulkhead when said body portion is inserted into said bulkhead opening.

* * * * *